(12) United States Patent
Kilibwa

(10) Patent No.: US 6,830,770 B1
(45) Date of Patent: Dec. 14, 2004

(54) POLYDEXTROSE AS ANTI-STALING AGENT

(75) Inventor: Margaret Kilibwa, Niantic, CT (US)

(73) Assignee: Danisco USA Inc., Kantvik (FI)

( * ) Notice: Subject to any disclaimer, the term of this patent is extended or adjusted under 35 U.S.C. 154(b) by 0 days.

(21) Appl. No.: 08/796,305

(22) Filed: Feb. 7, 1997

(51) Int. Cl.$^7$ .............................................. A21D 13/00
(52) U.S. Cl. .......................... 426/549; 426/19; 426/20; 426/61; 426/62; 426/94
(58) Field of Search ......................... 426/549, 94, 804, 426/19, 20, 61, 62

(56) References Cited

U.S. PATENT DOCUMENTS

| | | | |
|---|---|---|---|
| 4,042,714 A | | 8/1977 | Torres .......................... 426/62 |
| 4,668,519 A | * | 5/1987 | Dartey et al. ................ 426/548 |
| 4,678,672 A | * | 7/1987 | Dartey et al. ................. 426/19 |
| 4,684,526 A | | 8/1987 | Knightly ...................... 426/19 |
| 5,164,216 A | * | 11/1992 | Engelbrecht et al. ....... 426/549 |
| 5,262,187 A | * | 11/1993 | Hahn ......................... 426/496 |
| 5,340,598 A | * | 8/1994 | Hay, Jr. et al. .............. 426/496 |
| 5,514,404 A | * | 5/1996 | Zimmerman et al. ....... 426/549 |
| 5,629,036 A | * | 5/1997 | Yanetani et al. .............. 426/19 |

FOREIGN PATENT DOCUMENTS

| | | |
|---|---|---|
| EP | 0 137 326 A1 | 4/1985 |
| WO | WO 92/00012 | 1/1992 |

OTHER PUBLICATIONS

The Encyclopedia of Chemical Technology, pp. 880 and 882., 1992.*

"Uber das Altbackenwerden von Brot—II. Mitt.: Frischhalteefekt von Bakterien–. Pilz–und Getreide–Alpha–Amylasen". M. Maleki. A. Schulz and J.M. Bruemmer. *Getreide Mehl Brot.* 26:221. 1972.

"Starch Retrogradation in Various Bread Products". P.E. Pelshenke and G. Hampel. *The Baker's Digest.* p. 48. Jun. 1962.

"Effect of Pentosans on the Retrogradation of Wheat Starch Gels". S.K. Kim and B.L. D'Appolonia. *Cereal Chemistry,* vol. 54. p. 150. 1977.

* cited by examiner

Primary Examiner—Lien Tran
(74) Attorney, Agent, or Firm—Knoble Yoshida & Dunleavy, LLC

(57) ABSTRACT

A method for making a baked product having improved anti-staling properties is disclosed. The method includes the steps of forming a dough by combining flour, yeast, water and 1–5% by flour weight of polydextrose, and baking the dough. In one version of the invention, polydextrose is used in combination with an emulsifier such as glycerol monostearate, mono-diglycerides, sodium stearyl lactylate and datem. In another version of the invention, polydextrose is used in combination with an enzyme or in combination with an enzyme and an emulsifier. Suitable enzymes include bacterial and fungal amylases, pullulanase, amyloglucosidase, pentosanase, xylanase and maltogenic x-amylase. In yet another version of the invention, polydextrose is used in combination with fiber. A dough for producing a baked product having improved anti-staling properties is also disclosed. The dough includes flour, yeast, water, and 1–5% by flour weight of polydextrose. Optionally, the dough may include fiber, enzymes or emulsifiers. The use of polydextrose in combination with flour, alone or in combination with certain emulsifiers, enzymes or fiber provides improved anti-staling properties and improvement in bread crumb structure for breads and other baked products. These improved properties are achieved without adverse affect upon organoleptic characteristics of the baked goods.

35 Claims, 6 Drawing Sheets

Bread Crumb Firmness Acceleration (Shelf Life)

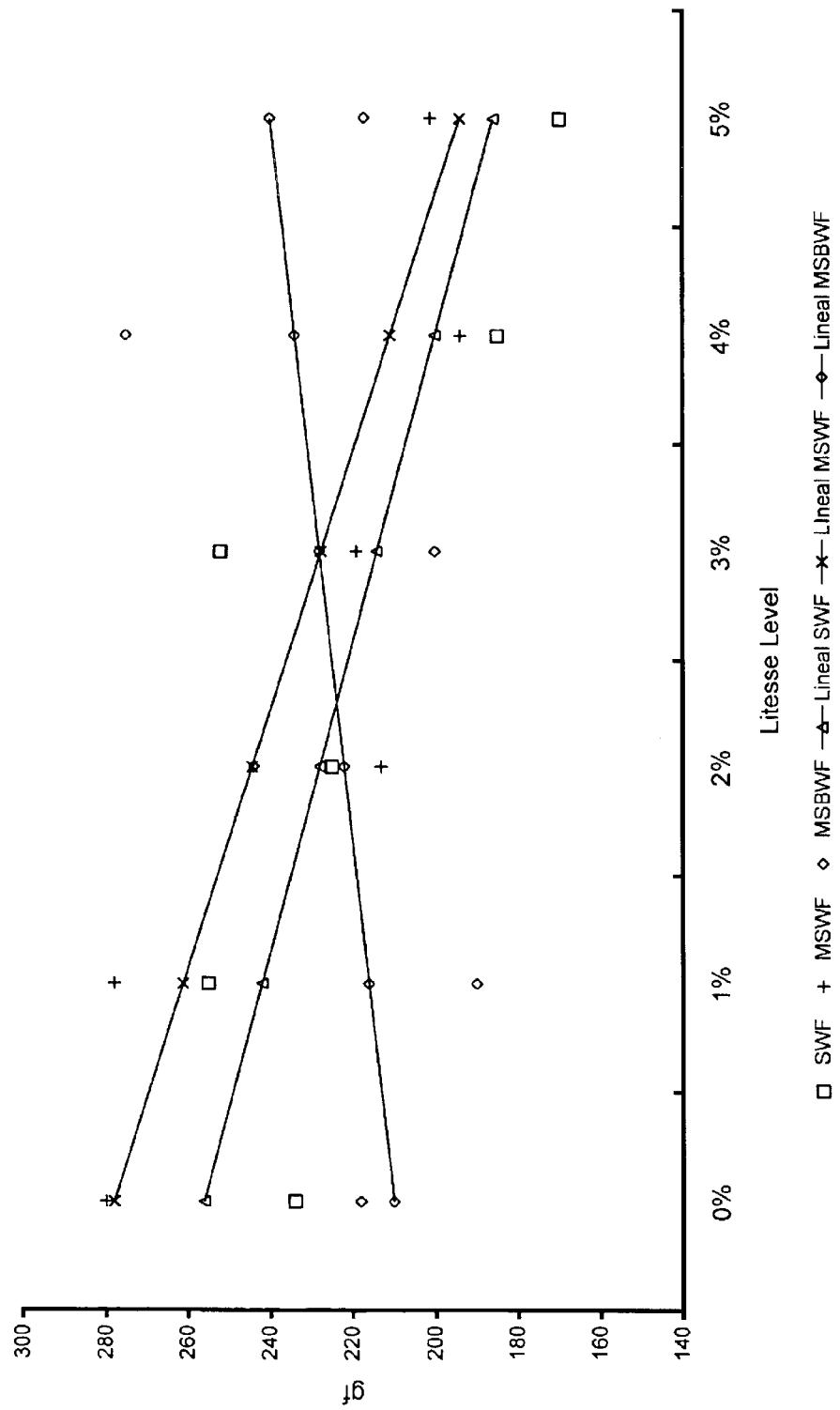

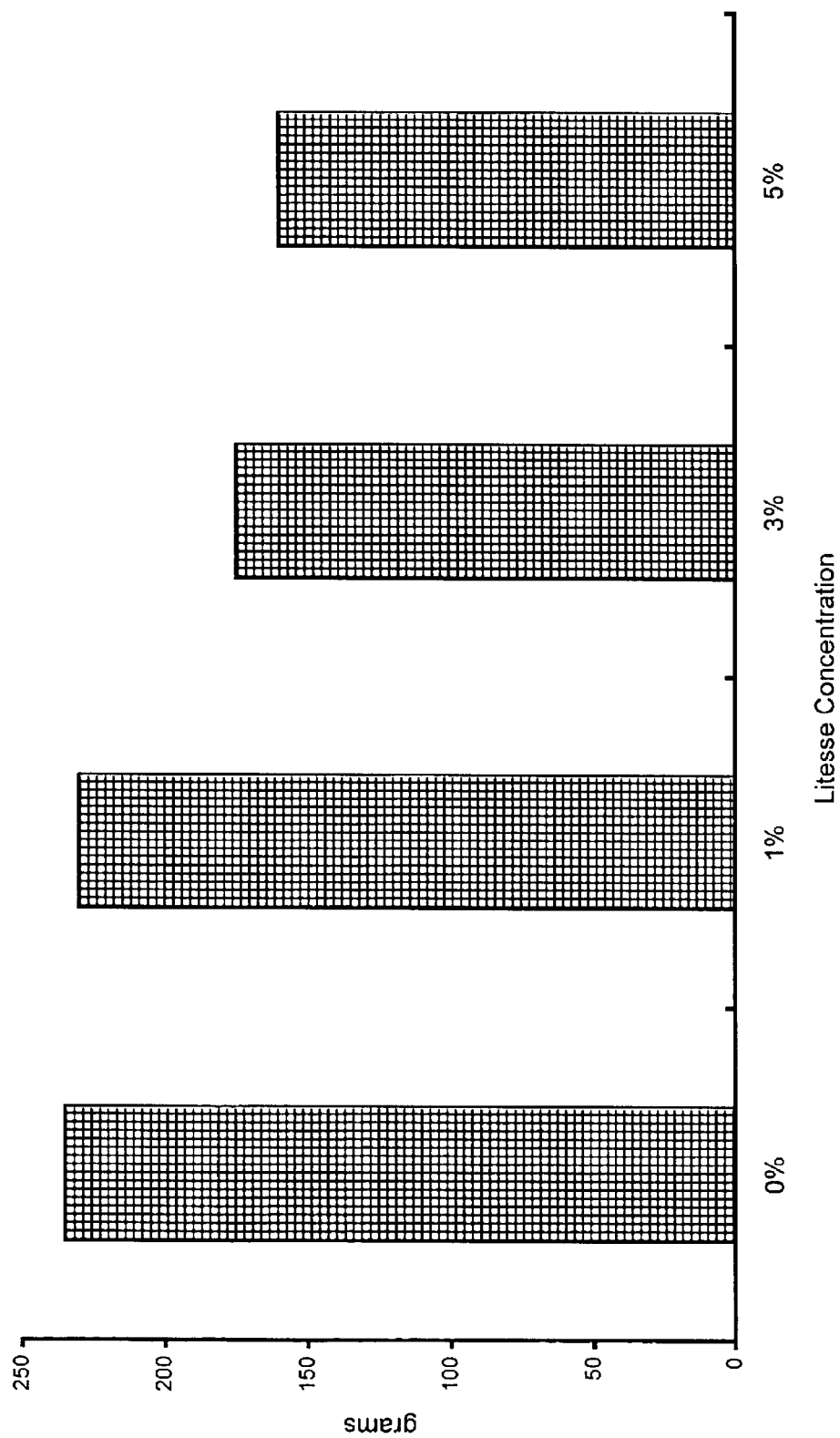

POLYDEXTROSE AS ANTI-STALING AGENT

FIELD OF THE INVENTION

This invention relates to a method used for retarding the staling of bread and other baked products and extending their shelf life.

BACKGROUND OF THE INVENTION

Baked products, such as bread, muffins, cakes, cookies, donuts and other pastries, typically are subject to staling and other instabilities. For example, after manufacture, such products tend to lose their desirable texture and flavor qualities associated with freshness.

In particular, enriched breads, such as the familiar mass-produced, slice wrapped white breads have relatively short shelf lives, and can have shelf-lives of about five days or less, after which it typically is considered to be stale. So-called "sweet baked" products that have high sugar and fat content (such as donuts and cake) tend to stale at a slower rate because the presence of sugar and fat retard staling, but products with lower sugar and fat content (such as muffins) stale relatively quickly.

The product and monetary losses for the international baked products industry due to such staling are substantial. The relatively short shelf-life of bread products and sweet baked products with lower sugar and fat content also has resulted in a need to create and maintain production and distribution systems that operate within the limited window of salability proscribed by the staling phenomena—resulting in further production, warehousing, inventory control and distribution inefficiencies.

Various techniques and additives to increase the length of time before staling (and thus the shelf life) of baked products, in particular bread products, have been developed and used. These have included the use of use of preservatives in the dough mix, reduction of oxygen content of packaging, reduction of moisture loss and acidification. These approaches have also included use of controlled atmospheric packaging and incorporation in the bread dough of additives which inhibit enzymatic and non-enzymatic browning.

It was demonstrated by Boussingault in 1852 that the staling of bread is not due to the loss of moisture by the drying-out process. In his experiments, Boussingault sealed bread in a glass tube to prevent moisture loss. He found that although the moisture content remained constant under these conditions, the bread became stale. As breads lose moisture during storage, however, they become firmer and less acceptable. It is generally known that breads containing higher levels of water stale at a slower rate. J. B. Boussingault. *Experiments to determine the transformation of fresh bread into stale bread*. Ann. Chem. Phys. 36:490, 1852. Hence, improved packaging can lead to reduced staling, but packaging cannot eliminate staling. Further, some baked products (including breads and muffins) can be and are sold without packaging.

Kim and. D'Appolonia have shown that addition of water insoluble pentosans to bread doughs slow down the overall aging of starch gels and hence retard bread staling. Pentosans of flour have similar properties to vegetable gums. They are viscous at room temperature, thin out during heating, and are highly hydrophilic. Although effective in retarding bread staling, water insoluble pentosans have resulted in remarkable reduction in bread volume. Bread volume is considered one of the most important, if not the single most important attribute of a bread product, so materially reducing volume reduces the quality of the bread. S. K. Kim and B. J. D'Appolonia. *Effect of pentosans on the retardation of wheat starch gels*. Cereal Chemistry: 54:150, 1977.

Bacterial amylases derived from *B. Subtilis*, and other maltogenic amylases may be added to bread doughs as anti-staling agents. The enzymes work on the starch fraction of flour modifying the starch components in such a way that retrogradation is less likely to occur; they create low molecular weight sugars and dextrins which improve the water retention capacity of the baked goods. The difficulty in applying most enzymes commercially is that the activity must be carefully controlled for a wide variety of conditions encountered during bread baking and in distribution. At levels even 0.1% above recommended levels, or at higher storage temperatures all than expected, the enzyme activity in bread is so high that the bread becomes gummy and sticky and unacceptable to the consumer. Also, excessive amounts of the amylases and low baking temperatures produce gummy and weak crumb structure, causing problems at the slicer. At carefully controlled levels, however, amylases have been shown to retard bread firmness. M. Maleki, A. Schulz, and J. M. Bruaemmer. Staling of bread. II Effect of bacterial, fungal and cereal alpha-amylases on freshness. Getreide Mehl Brot. 26:211, 1972. Enzymes, however, are difficult to integrate and uniformly mix into a baked product; the amount of enzymes added have to be carefully calibrated. If enzymes are added at too high a level; the entire batch can be ruined.

The baking industry uses surface-active lipids, emulsifiers and crumb softeners, to produce the soft type bread preferred by most consumers. It is debatable as to whether surfactants actually decrease the rate of firming or merely produce soft bread whose crumb then firms at the same rate as that of bread made without surfactants. Pelshenki and Hampel have confirmed that shortening and emulsifiers resulted in softer bread crumb only during the first six hours after baking. Thereafter, both crumb firming and starch retrogradation increased more rapidly as compared with crumb containing no fat or surface active lipids. P. E. Pelshenki and G. Hampel. Baker's Digest. 36(3):48, 1962.

Therefore, despite extensive research of bread and other baked products staling during the past century, bakery products are still perishable. In particular, bread products stale relatively quickly. The majority of researchers attribute firmness changes principally to the physiochemical reactions of the amylopectin fraction of the starch components; although flour proteins may be involved to some degree. Retarding the firming rate (staling) by technological means such as processing, formulation, storage conditions, and additives has been of limited benefit. The main softening effects have been produced by the use of lipid surfactants. The use of heat-stable α-amylase and other enzymes is difficult to control but may be potentially useful. The known techniques have resulted in limited extensions of shelf life for commercial baked products, but these techniques sometimes result in negative organoleptic effects on the final baked products. Hence, there remains a need for developing techniques that decrease the rate of staling in baked products (particularly bread) without adversely affecting the handling properties of the dough (an important factor in commercial baking contexts where mass quantities of dough is processed) or the organoleptic qualities of the final product.

It has been discovered that polydextrose, when added to dough mixes, can retard staling in baked products, including bread. It has also been discovered that polydextrose may, in some contexts, improve certain dough handling properties and may also increase bread volume.

Polydextrose is a randomly bonded condensation polymer of D-glucose with some bound sorbitol and a suitable acid (e.g. citric acid). It is odorless and has a slight, tart taste. Polydextrose is very soluble in water. It is known to have uses as a fat substitute, foodstuff bulking agent, browning agent, texturizer, humectant and thickener for use in, for example, reduced-calorie products. Such reduced-calorie products include fat-free cookies, low-fat frozen desserts, reduced-fat peanut butter and fat-free salad dressings. It is believed that polydextrose does not contribute to dental cavities, does not cause as significant gastrointestinal disturbances, and does not significantly have caloric potential. Polydextrose typically can be melted at temperatures exceeding above 130 degrees Celsius. A typical 10 percent solution with water has a pH of approximately 2.5 to 3.5. The United States Food and Drug administration has approved polydextrose as a multipurpose food ingredient for such products as frozen dairy desserts, baked goods and mixes, confections and frostings, salad dressings, gelatins, puddings, and pie fillings, hard candy and soft candy, and chewing gum. Polydextrose has also been approved by various other nations' regulatory bodies for use as a food ingredient.

LITESSE® improved polydextrose FCC is a commercially available form of polydextrose available from Cultor Food Science which produces other forms of polydextrose.

Polydextrose has a higher water absorption capacity and thus increases the content of soluble carbohydrates. It is thought that the primary effect of polydextrose in reducing the rate of staling in baked products is to dilute the starch components thus reducing the available starch fractions for crystallization.

Emulsifiers such as glycerol monostearate are improved complexing agents with amylase and amylopectin fractions of starch. Maltogenic α-amylases are less sensitive to storage temperature fluctuations. A combination of polydextrose, emulsifiers and maltogenic α-amylases in a dough mix produces a baked product with a soft crumb texture and with a slower rate of staling. In addition, it has been discovered that a combination of polydextrose and fibre in a dough mix can result in a synergistic effect, improving dough handling properties and slowing down the rate of staling in the baked product.

SUMMARY OF THE INVENTION

The present invention alleviates to a great extent the disadvantages of the known anti-staling agents by providing a method for using polydextrose as an ingredient in baked products. The use of polydextrose in combination with flour, alone or in combination with certain emulsifiers and enzymes in accordance with the present invention provides improved anti-staling properties, improvement in bread crumb structure for breads and other baked products. These improved properties are generally achieved without adverse affect upon organoleptic characteristics of the baked goods. The dough made with the present invention demonstrates good handling properties and the final baked product is equal in quality or better than control breads baked without polydextrose. Moreover, gumminess that is normally associated with the use of enzymatic anti-staling compositions is also eliminated or minimized by the dosages of enzyme used according to the invention.

For breads and other non-sweetened baked goods, polydextrose is preferably added in the amount of between 1 percent to about 5 percent by flour weight, with polydextrose added in an amount of between about 2 percent to about 3 percent being particularly preferred. In sweet baked goods (such as muffins, cakes, pie crusts and the like) polydextrose is preferably added in the amount of between about 4% to about 10% by flour weight, with polydextrose added in an amount of between 4% to about 6% being particularly preferred. Too much polydextrose results in a sticky dough which cannot be processed efficiently.

The present invention can be used with commonly used dough preparation processes, such as the straight dough process, the sour dough process, the Chorleywood bread process and the sponge and dough process. The method of the present invention can be used to manufacture bread as well as sweet baked products such as cakes, muffins and pies.

In one embodiment, polydextrose is used in combination with emulsifier. Optionally, such an emulsifier can include glyceryl monostearate, mono-diglycerides, sodium stearyl lactylate and Datem (diacetyl tartaric esters of mono- and diglycerides). In another embodiment, polydextrose is used in combination with an enzyme or in combination with an enzyme and an emulsifier. Suitable enzymes could include bacterial and fungal amylases, pullulanase, amyloglucosidase, pentosanase, xylanase, and maltogenic α-amylase.

In yet another embodiment, polydextrose is used in combination with fiber. The combination of polydextrose and fiber shows some synergistic results, and produces a less sticky dough, and improved dough firmness and crumb cohesiveness.

BRIEF DESCRIPTION OF THE DRAWINGS

The above and other objects and advantages of the invention will be apparent upon consideration of the following detailed description, taken in conjunction with the accompanying drawings in which like reference characters refer to like parts throughout and in which:

FIG. 5 is a representation of the crumb firmness means data trend taken from Example 2 which is set forth later in this specification.

FIG. 6 is a representation of the effect of polydextrose on muffin hardness taken from EXAMPLE 3.

DETAILED DESCRIPTION OF THE PREFERRED EMBODIMENTS

EXAMPLE 1

Figure 1:
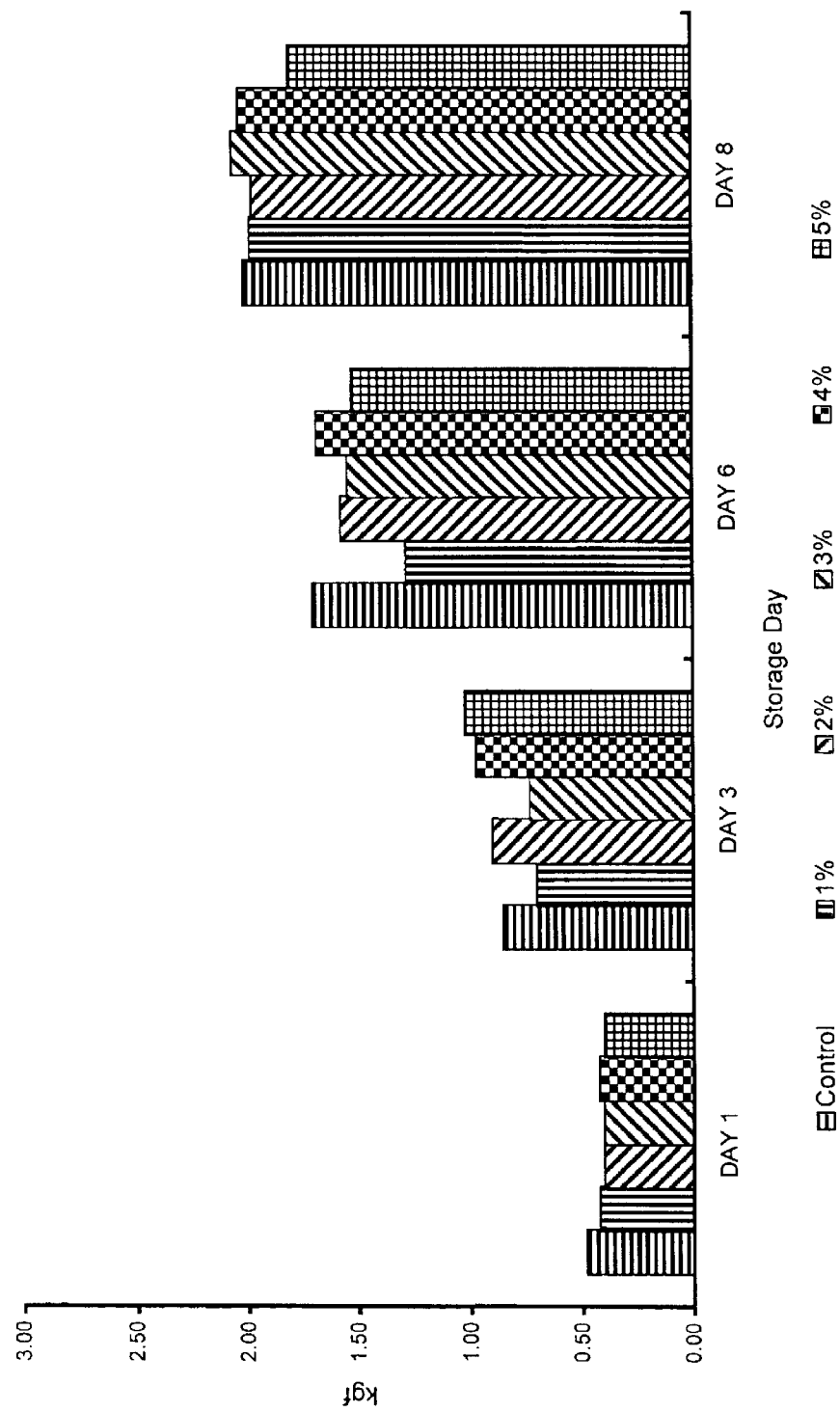
FIG. 1 is a graphical representation of the results of crumb firmness means taken from Example 1 which is set forth later in this specification.

Comparison of Control Doughs to Doughs Containing Polydextrose, and Polydextrose in Combination with Wheat Fiber A. Control Recipe A control recipe was prepared using the following ingredients:

|  | flour weight | g/mix |
|---|---|---|
| Flour | 100.0 | 5000 |
| Yeast (Compressed) | 2.5 | 125 |
| Salt | 2.0 | 100 |
| Water | 58.2 | 2910 |
| Fat (Ambrex, slip point c.45° C.) | 1.0 | 50 |
| Ascorbic acid (100 ppm) | 0.01 | 0.5 |
| Panodan '10' (90% Data ester) | 0.33 | 16.5 |
| Fungal alpha-amylase | 80 FU | 0.66 |

A single consignment of commercial breadmaking flour was obtained and stored at ambient temperature until use. Flour properties were as follows:

| Moisture % (1.5 hrs. @ 130° C.): | 13.9 |
|---|---|
| Protein %, Kjeldahl (n × 5.7) as is: | 11.8 |
| Damaged starch (Farrand units): | 42 |
| Alpha-amylase (Farrand units): | 12 |
| Grade Color Figure: | 2.0 |
| Falling Number: | 338 |
| Ascorbic acid (qualitative) spot test: | None |
| Added gluten: | Present |

B. Doughs Containing Polydextrose

Doughs were prepared which contained all of the ingredients of the control dough as well as the following:

Dough No. 1: Contained 200 ppm erythorbic acid, 3% (by weight) polydextrose (LITESSE) and 2% (by weight) wheat fiber.

Dough No. 2: Contained ascorbic acid, 3% (by weight) polydextrose (LITESSE) and 2% (by weight) wheat fiber.

Dough No. 3: Contained ascorbic acid and 3% (by weight) polydextrose (LITESSE).

C. Dough Mixing and Processing

All doughs were based on a flour level of 5 kg and produced using the "Chorleywood Bread Process". Mixing took place in a standard high-speed mixing machine at atmospheric pressure with no vacuum applied. Mixer speed was set to 300 rev/min. and work input was controls At 11 Watt Hours per kg of dough (Wh/kg). Dough temperature was controlled to 30.5±1° C. by adjusting water temperatures. All test doughs were duplicated and the order of mixing randomized.

Processing was carried out with the following regimen:

Mixing Machine: Tweedy 35
Work input: 11 Wh/kg
Pressure: Atmospheric
Dough temperature: 30.5±1° C.
Scaling: By hand to 908 g
First molding: Into a ball by Conical molder
First proof: 6 min at ambient temperature
Final molding: Four-piece, (R9, W15.5, P0.25)
Pan size: Top 250 mm×122 mm, 125 mm deep
Shape: Lidded
Proving conditions: 43° C., humidity to prevent skinning
Proving height: 11 cm
Baking temperature: 244° C.
Oven type: Direct gas-fired reel
Baking time: 30 min
Baking humidity: No steam injected
Cooling: Open rack at room temperature
Storage: Closed cupboard overnight at 21° C.

D. Results

The rate of staling for the doughs Nos. 1, 2, 3 and a control dough (dough No. 4) are set forth below in Table 1.

In general, the breads using doughs containing polydextrose (LITESSE) exhibited a slower staling rate than the control bread. The doughs containing polydextrose (LITESSE) did exhibit more stickiness than the control dough. The combination of fiber and polydextrose (LITESSE) (dough Nos. 1 and 2) exhibited an anti-staling effect, and also produced a decrease in dough stickiness: Positive synergies are seen in the combination of polydextrose and fiber in respect of dough firmness and crumb cohesiveness.

Table 1 gives the mean values for crumb hardness and percent change in the values after five and seven days of storage respectively:

TABLE 1

|  | Hardness (N) | | % Change | |
|---|---|---|---|---|
| Dough | D5 | D7 | D5 | D7 |
| 1 | 535.2 | 801.0 | 129.0 | 242.7 |
| 2 | 299.0 | 474.1 | 73.9 | 175.8 |
| 3 | 336.7 | 516.5 | 91.3 | 193.5 |
| 4 | 265.4 | 409.8 | 147.1 | 281.6 |

To assess hardness of the breads a Texture Profile Analysis was used to monitor the extent of bread staling during storage. The tests were performed on a Stable Micro Systems Texture Analyzer under the following conditions:

| Option: | TPA |
|---|---|
| Force units: | Grams |
| Distance format: | mm |
| Pre-test speed: | 2.0 mm/s |
| Test speed: | 2.0 mm/s |
| Post-test speed: | 10.0 mm/s |
| Distance: | 7.0 mm |
| Time: | 0.50 s |
| Trigger type: | Auto |
| Trigger force: | 5 g |
| Data acquisition rate: | 200 pps |

Two cylindrical cores of 4 cm in diameter and 2 cm in height were removed from standard positions of the loaf crumb. Two loaves were used per day. Core samples were weighed and then subjected to two consecutive compressions to provide a free-distance curve. To determine changes in bread staling, the measured hardness value was taken and corrected for bread core density. Hardness is described as the force necessary to obtain a given deformation. On a practical level, this is representative of the force required to compress the food between the molar teeth.

EXAMPLE 2

Use of Polydextrose in White Bread
BREAD BAKING

Hard spring wheat flours were used in this example with three different types of gluten:

- strong wheat flour (SWF)
- medium strong wheat flour (MSWF)
- medium strong-bucky wheat flour (short gluten) (MSBWF)

The flours were supplied by CIMMYT (International Maize and Wheat Improvement Center).

Bread was baked in this example under the following standardized conditions. White straight-dough breads were produced according to the approved methods of AACC 10—10 with the following changes in times of fermentation as well as in formulation:

Total fermentation time: 150 minutes
first dough punch after 80 minutes
second dough punch after 45 minutes
molding after additional 25 minutes
Formula:

| Ingredient | Flour Basis |
| --- | --- |
| flour, 14% moisture basis | 100 g |
| vegetable shortening | 3 g |
| dry whole milk | 3 g |
| yeast suspension | 25 ml |
| salt-sugar solution | 25 ml |

Water absorption was determined using flour protein content. It was modified according to the operator criteria of dough consistency. At the beginning, mixing time was determining by the mixing time in mixograph. Then, mixing time was modified according to operator criteria of dough structure and consistency.

Lower values indicate a greater tolerance to overmixing. Angle between the ascending and descending portions of the curve at the peak provides information about the tolerance index. Higher values indicate a greater tolerance to overmixing. Ascending portion at 0.5 minutes past the start of the mixing, and descending portion at 2 minutes past from the peak height were used.

Bread Crumb Firmness

The Instron Universal Testing Machine was used to measure crumb firmness. Firmness is measured as the force required to produce a constant deformation in the sample. The instrument is a widely used instrument that uses the parallel plate geometry to apply uniaxial compression to a sample of bread crumb.

50% of compression was used. A range of 5 was used. A 2.5 cm sample was used. The method used was that according with Baker et al. procedure. Baker A. E., Duerry, W. T., Kemp, K. Instron Factors involved in measuring crumb firmness, Cereal Foods World 31(2) 193–195. The peak height of the first compression is a measure of the crumb firmness and it is measured in kg force.

For each evaluation, the loaf of bread was cut into 4 slices, one for each day of measurement. The borders were kept and each loaf was placed in a sealed plastic bag. This was made in order to approximate the consumer's storage condition.

The firmness profile was found by relating the storage periods with the force required for crumb compression (regression coefficients). The average of the two repetitions were used to obtain a firmness against storage days graph. Lineal regression was obtained for each graph. The slope of each curve was used as the crumb firmness daily increase or crumb quality deterioration kinetics.

Each data were multiplied by 1000 so the MSTAT computing program did not convert the small numbers into zero. Thus, the measures were in gram force, instead of kg force.

Results

Breads were baked in accordance with the procedures described above; a control dough (with no added polydextrose) and doughs which levels of polydextrose at 1%, 2%, 3%, 4% and 5% by weight were prepared. Polydextrose utilized was LITESSE® improved polydextrose. Breads were baked with three types of gluten flours (SWF, MSWF and MSBWF).

Bread Crumb Firmness Acceleration

The analysis of variance for the crumb firmness kinetics is presented below in Table II.

TABLE 11

Analysis of Variance for Crumb Firmness Acceleration

| K Value | Source | Degrees of Freedom | Sum of Squares | Mean Square | F Value | Probability |
| --- | --- | --- | --- | --- | --- | --- |
| 1 | Replication | 3 | 31282.937 | 10427.646 | 8.7390 | 0.0001 |
| 2 | Type of gluten | 2 | 2382.330 | 1191.165 | 0.9983 | |
| 4 | LITESSE Concentration | 5 | 19457.302 | 3891.460 | 3.2613 | 0.0125 |
| 6 | Interaction | 10 | 52297.066 | 5229.707 | 4.3828 | 0.0002 |
| −7 | Error | 51 | 60855.105 | 1193.237 | | |
| | Total | 71 | 166274.740 | | | |

Figure 2:
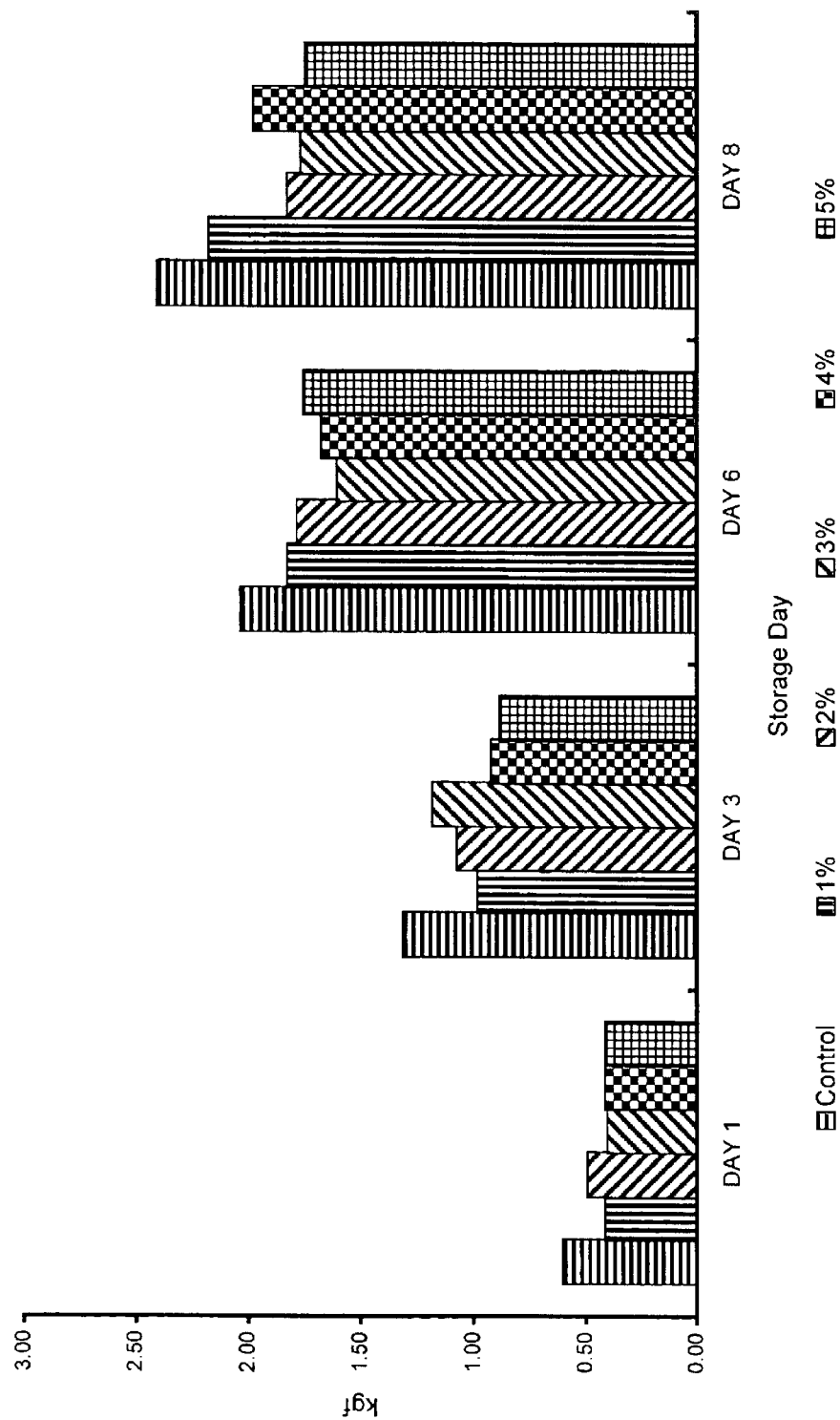
FIG. 2 graphically illustrates the results of crumb firmness means taken from Example 2 which is set forth later in this specification.
Figure 3:
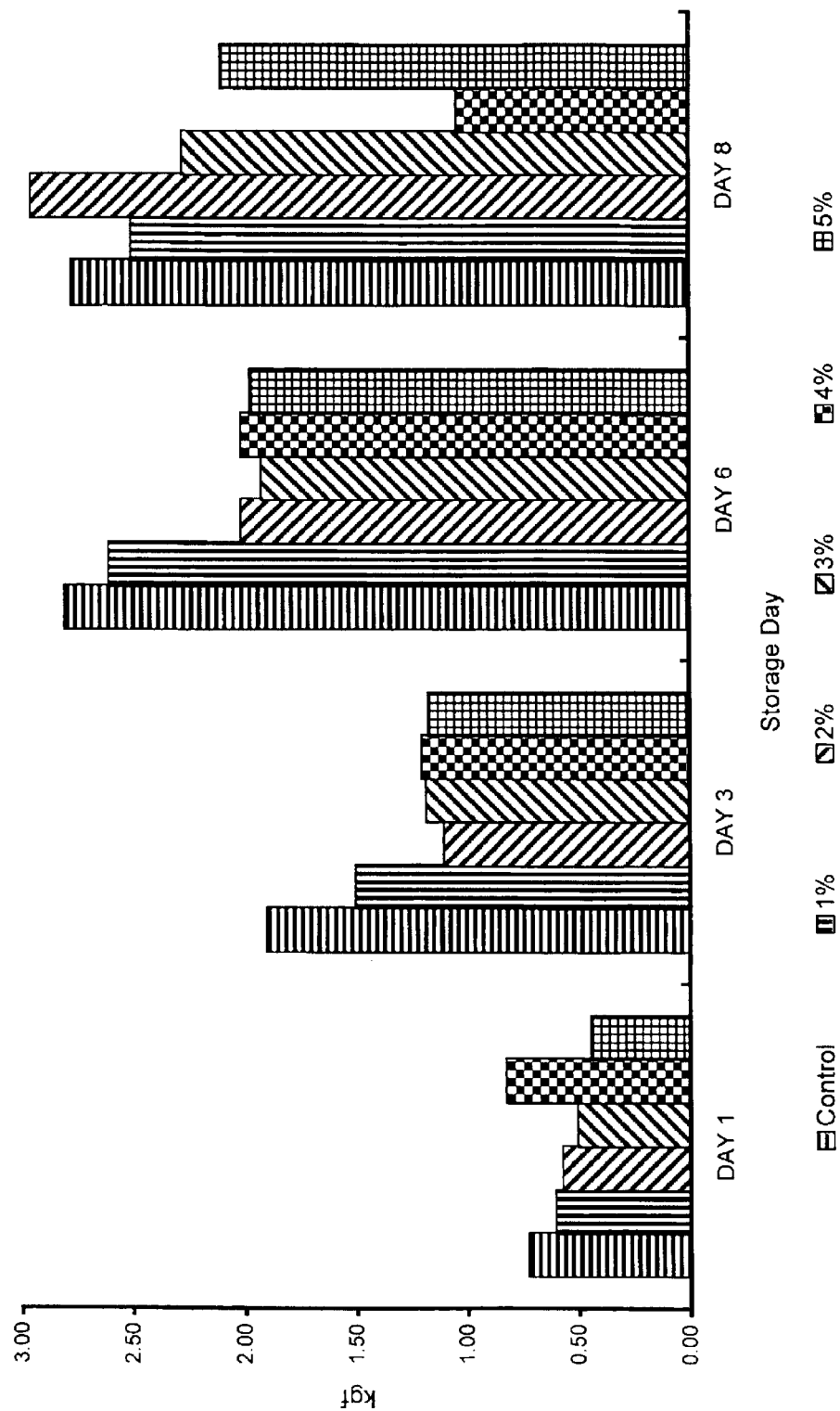
FIG. 3 is a graphical representation of the results of crumb firmness means taken from Example 2 which is set forth later in this specification.
Figure 4:
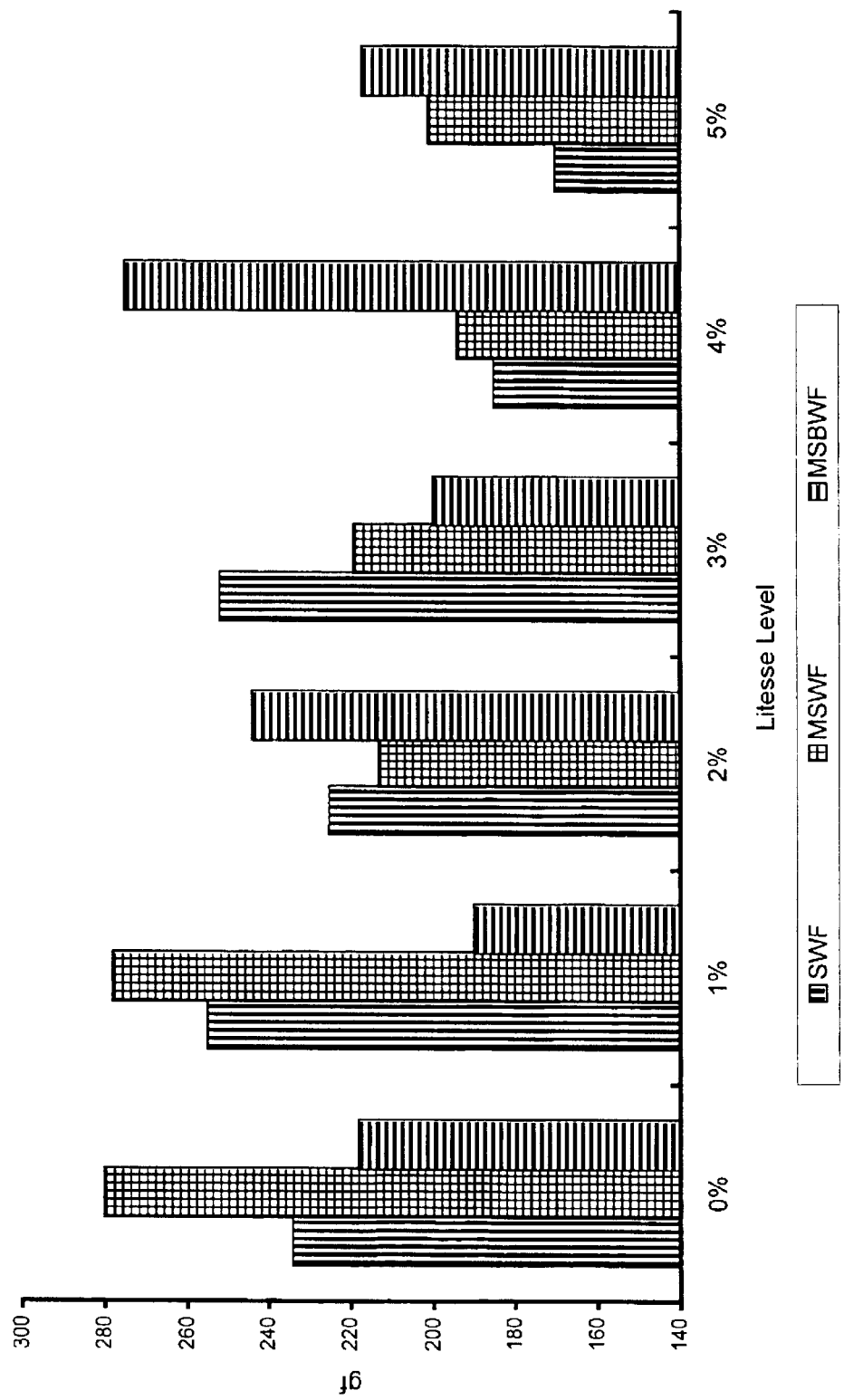
FIG. 4 is a graphical representation of crum firmness acceleration taken from Example 2 which is set forth later in this specification.

The crumb firmness means during the different storage days, for the three flours with the 6 levels of addition, are presented in FIGS. 1, 2 and 3 respectively. The crumb firmness acceleration is shown in FIG. 4, as well as the data trend in FIG. 5.

The firmness values increased with the time rate as shown in the FIGS. 1, 2 and 3. A diminishment in crumb firmness can be observed with the increase of polydextrose (LITESSE) level and in relation to the controls, in each day. The effect of polydextrose on crumb firmness acceleration shows that as the concentration increases, a decrease in the kinetics is attained.

Firmness of bread is an important criterion for the consumer and firmness characteristics of the crumb, are, indeed, an important component of bread freshness. Measurement of the rheological properties of bread crumb is closely related to evaluation of staling, and to general crumb quality control. In general the data demonstrates the presence of polydextrose is a positive factor in the control of staling in bread. This effect could be associated with the great hygroscopicity that polydextrose possesses.

Example 3

Polydextrose Added to Muffins

Muffins were baked using the following recipe:

MUFFIN FORMULA

| INGREDIENTS | % |
|---|---|
| Wheat Flour | 100 |
| Powder milk | 8 |
| Edible oil | 26.6 |
| Butter | 13.2 |
| Sugar | 60 |
| Eggs | 35 |
| Salt | 0.8 |
| Water | 53 |
| Baking powder | 4 |
| Sodium propionate | 0.3 |

Polydextrose was added to this recipe at levels of 1%, 3% and 5% (by weight) and the properties of muffins baked were analyzed. Springiness (the distance that the food recovers (height) during the time elapsed between end of first bite and beginning of second bite), hardness (the weight of the force peak on the first compression cycles), gumminess (energy required to masticate a semi-solid food to a state ready for swallowing) and chewiness (gumminess times springiness, i.e. the length of time a number of chews required to masticate a solid food to a state ready for swallowing) were measured. The analysis demonstrated that the presence of polydextrose improved muffin springiness (i.e. better structure recovery), improved muffin chewiness (i.e. chewiness decreased), improved muffin gumminess (i.e. reduced gumminess by making muffin easier to chew and swallow), and improved muffin hardness (i.e. hardness decreased compared to control and increased softness of the crumb) compared to control muffins without polydextrose. The results indicate that polydextrose has an anti-staling effect which would lengthen the shelf life of muffins.

TABLE III

Effect of Polydextrose on Springiness

| % Polydextrose | Springiness Means |
|---|---|
| 0% | −1.995 |
| 1% | −2.391 |
| 3% | −1.942 |
| 5% | −1.943 |

TABLE IV

Effect of Polydextrose on Chewiness

| % Polydextrose | Chewiness Means |
|---|---|
| 0% | 55.84 |
| 1% | 51.408 |
| 3% | 42.604 |

TABLE V

Effect of Polydextrose on Gumminess

| % Polydextrose | Gumminess Means |
|---|---|
| 0% | 77.495 |
| 1% | 74.164 |
| 3% | 60.985 |
| 5% | 49.972 |

FIG. 6 shows the effect of polydextrose on muffin hardness.

Thus, it is seen that a method for improving the anti-staling properties of baked products is provided. One skilled in the art will appreciate that the present invention can be practiced by other than the preferred embodiments, which have been presented for purposes of illustration and not of limitation, and the present is limited only by the claims which follow.

What is claimed is:

1. A method of making a baked product having improved anti-staling properties, the method comprising the steps of:
    forming a baking dough by combining flour, yeast, water, fiber, and water-soluble polydextrose anti-staling agent in an amount of from 1 percent to 5 percent by weight, based on the weight of the flour; and
    baking the dough.

2. The method of claim 1 wherein said polydextrose is present in the baking dough in an amount of from about 2 percent to about 3 percent by weight, based on the weight of the flour.

3. The method of claim 1 wherein said baked product is a bread.

4. The method of claim 3 wherein said baking dough is prepared by means of a process selected from the group consisting of straight dough processes, sour dough processes, Chorleywood bread processes, and sponge and dough processes.

5. The method of claim 1 wherein said baked product is a sweet baked product containing sweeteners or sweetening agent.

6. The method of claim 5 wherein said sweetening agents include intense sweeteners.

7. The method of claim 1 wherein said baking dough further comprises one or more enzymes with anti-staling properties.

8. The method of claim 7 wherein said one or more enzymes are selected from the group consisting of amylase, pullulanase, amyloglucosidase, pentosanase, xylanase, and maltogenic α-amylase.

9. A method of making a baked bread product having improved anti-staling properties, the method comprising the steps of:
    forming a bread dough by combining flour, a leavening agent, water, and water-soluble polydextrose anti-staling agent in an amount of from 1 percent to 5 percent by weight, based on the weight of the flour; and
    baking the bread dough,
    wherein said bread dough further comprises fiber and wherein said polydextrose and fiber are present in a ratio of about 1:1 to about 5:1.

10. The method of claim 9 wherein said bread dough further comprises a second anti-staling agent selected from the group consisting of glycerol monostearate, mono-diglycerides, sodium stearyl lactylate and Datem.

11. The method of claim 9 wherein said bread dough further comprises one or more enzymes with anti-staling properties.

12. The method of claim 11 wherein said one or more enzymes are selected from the group consisting of amylase, pullulanase, amyloglucosidase, pentosanase, xylanase, and maltogenic α-amylase.

13. A baking dough used for making a baked product, the baking dough comprising:

flour, yeast, water, fiber and water-soluble polydextrose anti-staling agent in an amount of from 1 percent to 5 percent by weight, based on the weight of the flour.

14. The baking dough of claim 13 wherein said polydextrose is present in the baking dough at a level of about 2 percent to about 3 percent by weight, based on the weight of the flour.

15. The baking dough of claim 13 wherein said baked product is a bread.

16. The baking dough of claim 13 wherein said baked product is a sweet baked product comprising at least one material selected from the group consisting of sweeteners and sweetening agents.

17. The baking dough of claim 16 wherein said sweetening agents comprise intense sweeteners.

18. The baking dough of claim 13 further including one or more enzymes with anti-staling properties.

19. The baking dough of claim 18 wherein said one or more enzymes are selected from the group consisting of amylase, pullulanase, amyloglucosidase, pentosanase, xylanase, and maltogenic α-amylase.

20. A bread dough used for making a baked bread product, the bread dough comprising:

flour, a leavening agent, water, fiber, and water-soluble polydextrose anti-staling agent in an amount of from 1 percent to 5 percent by weight, based on the weight of the flour, wherein said polydextrose and fiber are present in a ratio of about 1:1 to about 5:1.

21. The bread dough of claim 20 wherein said polydextrose is present in the bread dough in an amount of from about 2 percent to about 4 percent by weight, based on the weight of the flour.

22. The bread dough of claim 20 wherein said polydextrose is present in the bread dough in an amount of from about 2 percent to about 3 percent by weight, based on the weight of the flour.

23. The bread dough of claim 20 wherein said bread dough further comprises a second anti-staling agent selected from the group consisting of glycerol monostearate, mono-diglycerides, sodium stearyl lactylate and Datem.

24. The bread dough of claim 20 wherein said bread dough further comprises one or more enzymes with anti-staling properties.

25. The bread dough of claim 24 wherein said one or more enzymes are selected from the group consisting of amylase, pullulanase, amyloglucosidase, pentosanase, xylanase, and maltogenic α-amylase.

26. A method of making a baked bread product having improved anti-staling properties, the method comprising the steps of:

forming a bread dough by combining flour, a leavening agent, water, and water-soluble polydextrose anti-staling agent in an amount of from 1 percent to 5 percent by weight, based on the weight of the flour; and baking the bread dough, wherein the baked bread product is a muffin.

27. A bread dough used for making a baked bread product, the bread dough comprising:

flour, a leavening agent, water, and water-soluble polydextrose anti-staling agent in an amount of from 1 percent to 5 percent by weight, based on the weight of the flour, wherein the baked bread product is a muffin.

28. The method of claim 1 wherein said bread dough further comprises a second anti-staling agent selected from the group consisting of glycerol monostearate, mono-diglycerides, sodium stearyl lactylate and Datem.

29. The baking dough of claim 13 wherein said baking dough further comprises a second anti-staling agent selected from the group consisting of glycerol monostearate, mono-diglycerides, sodium stearyl lactylate and Datem.

30. The method of claim 9 wherein said baked bread product is a sweet baked bread product comprising at least one material selected from the group consisting of sweeteners and sweetening agents.

31. The method of claim 30 wherein said sweetening agents comprise intense sweeteners.

32. The bread dough of claim 20 wherein said baked bread product is a sweet baked bread product comprising at least one material selected from the group consisting of sweeteners and sweetening agents.

33. The bread dough of claim 32 wherein said sweetening agents comprise intense sweeteners.

34. The method of claim 9 wherein said polydextrose is present in the bread dough in an amount of from about 2 percent to about 4 percent by weight, based on the weight of the flour.

35. The method of claim 9, wherein said polydextrose is present in the bread dough in an amount of from about 2 percent to about 3 percent by weight, based on the weight of the flour.

* * * * *